Feb. 19, 1952     H. KRONBERGER     2,586,060
ARRANGEMENT FOR MEASURING OR INDICATING THE FLOW OF FLUIDS
Filed Sept. 18, 1947
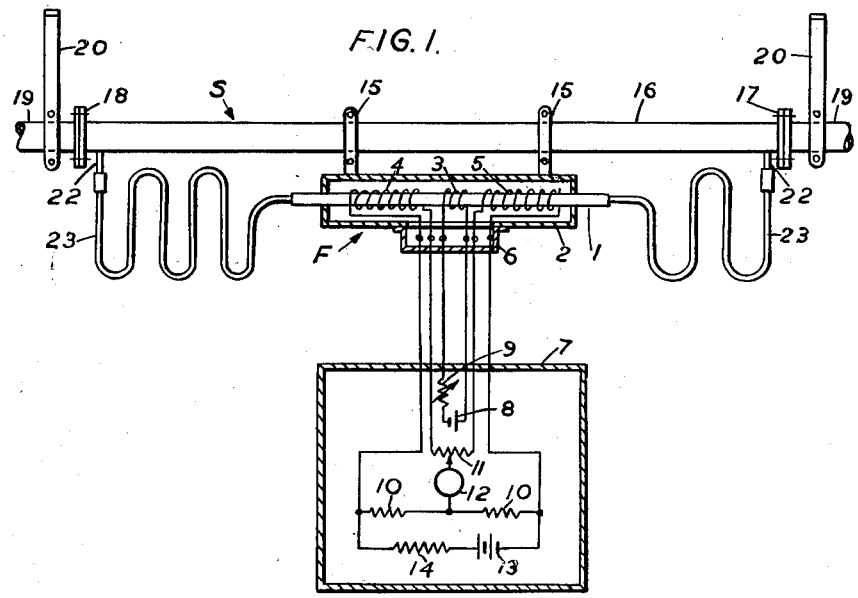
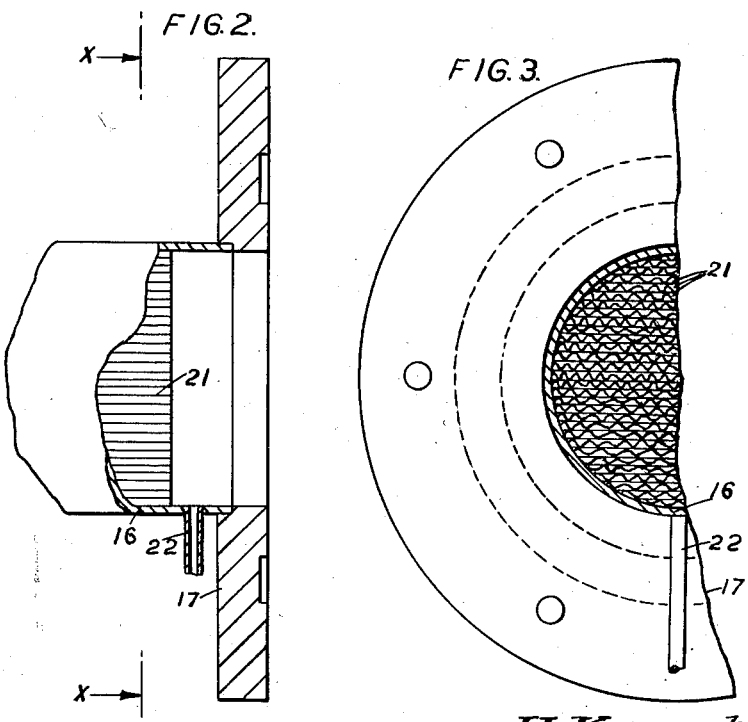
Inventor
H. Kronberger
By
                     Attorneys Patented Feb. 19, 1952

2,586,060

UNITED STATES PATENT OFFICE 2,586,060

ARRANGEMENT FOR MEASURING OR INDICATING THE FLOW OF FLUIDS

Hans Kronberger, Harwell, England, assignor to Minister of Supply in His Majesty's Government of the United Kingdom of Great Britain and Northern Ireland, London, England Application September 18, 1947, Serial No. 774,807
In Great Britain October 1, 1946

4 Claims. (Cl. 73—202)

This invention relates to arrangements for measuring or indicating the rate of flow of fluids. It is applicable to flowmeters of the kind comprising a channel for fluid flow, means for dissipating in the channel energy from an external source and means for measuring a resulting temperature gradient or temperature difference along the channel. Such flowmeters may be termed calorimetric mass-flowmeters and certain forms thereof are referred to and disclosed in British patent specification No. 591,690. The invention is also applicable to other flowmeters having a linear flow-pressure characteristic under low-velocity flow conditions, for example, flowmeters wherein the pressure drop through a capillary or other tube is measured.

The calorimetric mass-flowmeter shows special advantages in linear response (a constant relation between flow and temperature gradient) and shortness of equilibrium time when the channel for fluid flow is made of small dimensions usually of the order of a few inches in length and a fraction of an inch in width or diameter. Such dimensions are also convenient on grounds of compactness. Linear response is however only attainable under conditions of low-velocity flow.

The invention has for an object to extend the range of a linear flowmeter to deal with large rates of flow and consists in providing a large number of channels in parallel and in utilising one of these channels for flow measurement for example by providing it with heating and temperature-measuring means.

The channel used for flow measurement may be regarded as a flowmeter proper and the remaining channels as a shunt therefor. Thus in another aspect of the invention a flowmeter tube is shunted for fluid flow by a large number of channels similar to each other. In the case of the calorimetric mass-flowmeter the tube is provided with means such as a resistance winding or electrical connections for heating it, and means for comparing the temperature at different points or regions along it.

A conduit subdivided by longitudinal partitions conveniently constitutes the multi-channel shunt.

The shunted tube preferably comprises a section adapted for flow measurement and capillary connections to that section, the capillary connections being of length chosen according to the range of flows to be measured and the pressure drop in the shunt.

The classes of flowmeters with which the invention is concerned operate over such low fluid-velocity ranges that the flow conditions are laminar. A requirement of the shunt is that the flow through it should also be laminar for pressure drops needed for the meter tube since otherwise the pressure drop in the meter tube would not be linearly related to the total fluid flow, in other words the branching ratio would not be independent of fluid flow.

The required laminar flow conditions could be met by a shunt consisting of a long length of ordinary pipe but the diameter of such a pipe would need to be several times that of the normal pipe line for the flows in question and this, together with the corresponding length of pipe required to produce sufficient pressure drop for the flowmeter, would make the dimensions either impracticable or inconvenient. In accordance with the invention a shunt path is provided the total cross-sectional area of which may be of the same order as the normal pipe line but the path is subdivided into a number of channels such that the flow is essentially laminar, to give a branching ratio which is constant to the degree of accuracy required in the flow measurement.

The considerations which arise in establishing a fluid flow system involving a meter path and a shunt path such that the branching ratio remains constant and independent of the fluid pressure difference may be stated as follows:

For laminar flow of an incompressible fluid through a channel the total pressure drop required to produce a flow of $w$ gms./sec. may be expressed as $Aw+Bw^2$, the first term representing the viscous pressure drop and the second term indicating the pressure drop needed to impart the necessary kinetic energy to the fluid. In this expression $$A=\frac{8L\eta}{\rho a^4 \pi} \text{ and } B=\frac{m}{\rho a^4 \pi^2}$$

where L is the length of the channel
$a$ is the equivalent radius of the channel
$\eta$ is the coefficient of viscosity of the fluid
$\rho$ is the density of the fluid,
the units being c. g. s. units, and $m$ is a numerical factor slightly larger than unity to introduce a correction for an error in A arising from an assumption of parabolic velocity distribution to the extremities of the channel; for the purposes of the invention this factor may be taken as unity.

Considering now the flow through two tubes of different size, the ends of which are kept at the same pressure difference—one representing the flowmeter branch, the other the shunt, we have for the shunting ratio $r$ $$r=\frac{w_1}{w_2}=\frac{A_2+B_2 w_2}{A_1+B_1 w_1}$$

the subscripts 1 referring to the shunt and the subscripts 2 referring to the flowmeter branch. It is therefore clear that the shunting ratio will, in general, depend on the flow, unless either (i) $\quad A_1/A_2 = r$ and $B_1/B_2 = r^2$ or (ii) $\quad B_1 w_1 \ll A_1$ and $B_2 w_2 \ll A_2$ According to (i) both the ratio of the cross-sectional areas of the tubes, and the ratio of their lengths must be equal to the shunting ratio $r$. This requirement is not convenient in practice and is impracticable for large values of $r$, e. g. values of the order of 100,000. The significance of (ii) is that the kinetic energy term must be small as compared with the viscous pressure drop; this requirement is the one chosen to be satisfied in giving effect to the invention.

It may, in this connection, be useful to give a numerical example of the change of the shunting ratio with flow owing to the kinetic energy correction:

Consider a flowmeter of 2 mm. bore and 20 cm. length shunted by a tube of the same length, but of 3.56 mm. bore, in order to provide a shunting ratio of 10:1 the whole arrangement working between two reservoirs. The ratio will be ten for small flows; but already at a flow of 10 cc./sec. of air through the shunt, the branching ratio will be less by 14%.

If the shunt is subdivided into $n$ similar channels, then the percentage change of the branching ratio with mass flow $w$ through the shunt derived directly from the ratio of $Bw/A$ is $$\frac{100 \, mw}{8\pi \eta L n} \%$$

this can always be made small (½%, say) by making $n$ and $L$ sufficiently large.

If a compressible gas be considered the relation between flow and inlet and outlet pressures is different but the expression for the shunting ratio is unchanged.

A first requirement for the laminar multi-channel shunt is therefore that $$\frac{100 \, mw}{8\pi \eta L n}$$

should be of the same order as or less than, the maximum permissible percentage deviation from the linear response.

A second requirement is the condition for laminar flow, namely $$\frac{2 \, w}{\pi a n \eta} \ll 2000$$

It is furthermore necessary to insert sufficient flow resistance (e. g. in form of a capillary) into the flowmeter branch in order to keep the flow through it well within the linear range of the flowmeter proper.

A multichannel shunt for a maximum flow of 6 kg./hour of hydrogen at normal pressure will now be considered by way of example. The required mass flow is 1.67 gms./sec. and $\eta$ for hydrogen is 88 micro-poises. For a response linear to within one half per cent, the product $nL$ is therefore required to be $1.5 \times 10^5$ approximately. Hence for a length L of shunt of 3 ft. (91.5 cm.), the number of channels required is about 1600. The equivalent radius of each channel should not be smaller than $3 \times 10^{-3}$ cm. in order to ensure laminar flow.

An arrangement embodying the invention will now be described with reference to the accompanying drawing in which Fig. 1 is a general view, partially diagrammatic. Fig. 2 is a sectional view of the end of the flowmeter shunt forming part of the arrangement of Fig. 1 and Fig. 3 is a section on the line $xx$ of Fig. 2.

In this embodiment a flowmeter F of the form specifically described in the above-mentioned British patent specification and having a linear range of up to about 50 cc./min. of air or about 300 cc./min. of hydrogen at normal temperature and pressure is adapted by means of a shunt S (conforming to the foregoing numerical example) to measure flows of up to six kilograms per hour of hydrogen (5 kgs. hydrogen per hour corresponds roughly to $6.10^4$ litres per hour or a million ccs. per min. at N. T. P.).

Referring to the drawings, the flowmeter F comprises a metal tube 1 of length 6 inches and internal diameter 1.8 mm. traversing a thermal shield 2 and carrying a heater winding 3 and resistance thermometer windings 4 and 5. The windings are connected in a junction box 6 to a supply and indicating unit 7, the heating winding being supplied from a battery 8 through a resistor 9 and the thermometer windings being included in a bridge circuit comprising resistor arms 10, a balancing resistor 11 and a galvanometer 12, the bridge circuit being supplied from a battery 13 through a series resistor 14. The flowmeter is shown as carried on the shunt S by straps 15 but could be placed at a distance from the shunt.

The shunt S consists of a brass tube 16 of length 37" and of 2 inches internal diameter with flanges 17, 18 at its ends for coupling it in a standard two-inch pipe line 19 shown suspended by straps 20. The flanged ends of the tube have smooth internal surfaces of uniform diameter so as to avoid any disturbance in the flow at the couplings. The passage through the tube 16 is split up into a large number (approximately 1600) of similar narrow channels by longitudinal partitions. As shown in Figs. 2 and 3, these partitions are constituted by sheets 21 of tinned copper foil, alternate sheets being corrugated and the remainder being flat. Two short brass tubes 22 of one-sixteenth inch bore are soldered at right angles into the larger tube 16 one at each end thereof, the edges at entry being carefully rounded off. The flowmeter proper is connected between these short tubes by lengths totalling about 3 yards of copper capillary tubing 23 of 0.7 mm. bore. This tubing may be bent into sinuous shape as shown or into coils or other compact form; it may be suspended from or looped about the shunt tube 16.

In one method of forming and assembling the pack of sheets 21 in the tube 16, corrugated sheets were first produced in strips 36 inches long and several inches wide by passing strips of plane sheet metal between rollers shaped to form corrugations about 1 mm. deep and 2 mm. wide. Once the pressure on the rollers had been properly adjusted the sheets emerged perfectly straight. The corrugated sheets were then cut to the required widths by means of a guillotine.

Cutting of the corrugated sheet across the corrugations leads to deformation and closing up of the channels unless special precautions are taken, and such cutting is therefore avoided by making the strips of the required final length before the corrugations are rolled in. For the assembly of the pack of sheets in the tube, the tube was cleaned and fluxed and a steel strip 37 inches long and 2 inches wide, inserted in order to form a "floor" across its diameter. A stack of strips of the sheet metal, alternately corrugated and plane, and the whole covered with flux was then inserted so that half of the tube on one side of the steel strip was completely filled, no spaces larger than the channels formed by the corrugations being left. The stack was fixed in position by heating the tube to melt the tinned surfaces of the strips, for example, by means of an electric heating coil wound on the outside of the tube. The steel strip was then removed and the remaining half of the tube filled with alternate plane and corrugated strips which were soldered in position in the same way as the first stack.

A flowmeter incorporating a shunt as described above, with a straight three-foot length of two-inch pipe at each end of the shunt to ensure straight lines of flow was calibrated and found to give a linear response within one half per cent for flows varying from low values up to five kilograms hydrogen per hour. At maximum flow the pressure drop introduced into the pipe line by the shunt was of the order of one centimetre of mercury. For the smaller flows, a greater sensitivity was attainable by shortening the lengths of the capillary tubes connecting the flowmeter proper to the shunt. The response time of the arrangement is given by that of the calorimetric flowmeter, which was found to respond to changes of flow within a matter of seconds, although the equilibrium time was of the order of one minute.

I claim:

1. An arrangement for measuring a rate of fluid flow comprising a flowmeter associated with a tube of cross sectional area sufficiently small in relation to its length that for the fluid being measured the kinetic pressure drop is small compared with the viscous pressure drop and substantially laminar flow obtains over a wide range of flow rates shunted by a flow resistance constituted by a number of passageways each dimensioned as is said tube to provide laminar flow and being sufficient in number and length for the percentage change in branching ratio of flow rates to be less than the flowmeter's percentage deviation from linear response over said range.

2. An arrangement as claimed in claim 1 wherein said passageways are constituted by a conduit subdivided by longitudinal partitions.

3. An arrangement as claimed in claim 1 wherein the flowmeter comprises an electrical heater on the tube and means for comparing the temperatures at different points or regions along the tube.

4. An arrangement as claimed in claim 1 wherein the tube is in series with a capillary of a length chosen according to the range of flows to be measured.

HANS KRONBERGER.

REFERENCES CITED

The following references are of record in the file of this patent:

UNITED STATES PATENTS

| Number | Name | Date |
|---|---|---|
| 946,886 | Thomas | Jan. 18, 1910 |
| 1,103,931 | Bennett | July 21, 1914 |
| 1,254,374 | Thomas | Jan. 22, 1918 |
| 1,765,776 | Schur | June 24, 1930 |
| 2,423,155 | Phillips | July 1, 1947 |

FOREIGN PATENTS

| Number | Country | Date |
|---|---|---|
| 837 | Great Britain | 1906 |
| 460,013 | France | Sept. 23, 1913 |